US011448364B2

(12) United States Patent
Mallick et al.

(10) Patent No.: US 11,448,364 B2
(45) **Date of Patent: *Sep. 20, 2022**

(54) LIGHTWEIGHT COMPOSITE OVERWRAPPED ACCUMULATORS

(71) Applicant: Steelhead Composites, LLC, Golden, CO (US)

(72) Inventors: Kaushik Mallick, Thornton, CO (US); Michael W. Stewart, Wheat Ridge, CO (US); Annalisa Padget-Shields, Englewood, CO (US); Jacob Schrader, Westminster, CO (US); John Cronin, Lakewood, CO (US); Andrew Coors, Houston, TX (US)

(73) Assignee: STEELHEAD COMPOSITES, INC., Golden, CO (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/864,030

(22) Filed: Apr. 30, 2020

(65) Prior Publication Data

US 2020/0256512 A1 Aug. 13, 2020

Related U.S. Application Data

(63) Continuation-in-part of application No. 15/389,374, filed on Dec. 22, 2016, now Pat. No. 10,641,431.

(51) Int. Cl.
*F16L 55/04* (2006.01)
*F17C 1/06* (2006.01)

(52) U.S. Cl.
CPC ........ *F17C 1/06* (2013.01); *F17C 2201/0185* (2013.01); *F17C 2201/06* (2013.01); *F17C 2260/011* (2013.01); *F17C 2270/0554* (2013.01)

(58) Field of Classification Search
CPC ................ F17C 1/06; F17C 2201/0185; F17C 2201/06; F17C 2260/011; F17C 2270/0554
(Continued)

(56) References Cited

U.S. PATENT DOCUMENTS 2,339,876 A * 1/1944 Phillips .................. F15B 1/125 138/30
2,904,077 A ‡ 9/1959 Trumper ................ F16F 9/082 138/30
(Continued)

*Primary Examiner* — James F Hook
(74) *Attorney, Agent, or Firm* — Don D. Cha; HDC Intellectual Property Law, LLP

(57) ABSTRACT

The present invention provides lightweight high-pressure accumulators that avoids diaphragm failure observed in conventional diaphragm accumulators. Lightweight high-pressure composite overwrapped accumulators of the invention are made from a plurality of hollow casings that are mated to form an accumulator housing. The accumulator housing is overwrapped with a composite material to provide additional mechanical strength and structural integrity. More significantly, the accumulators of the invention includes a plurality of annular grooves and a plurality of bulb on the flexible diaphragm such that the plurality of bulbs on the flexible diaphragm are placed in the plurality of annular grooves that are formed between the first and the second hollow casing. In this manner, diaphragm failure is significantly reduced or even completely eliminated during repeated high pressure charge/discharge cycle of the accumulator.

13 Claims, 3 Drawing Sheets

(58) Field of Classification Search
USPC .......................................................... 138/30
See application file for complete search history.

(56) References Cited

U.S. PATENT DOCUMENTS

| | | | | | |
|---|---|---|---|---|---|
| 3,168,907 | A ‡ | 2/1965 | Mercier | F15B 1/125 | 138/30 |
| 3,256,911 | A * | 6/1966 | Mercier | F16J 3/02 | 138/30 |
| 3,319,420 | A ‡ | 5/1967 | Mercier | F15B 1/20 | 138/30 |
| 3,420,273 | A ‡ | 1/1969 | Greer | A01B 61/046 | 137/513.3 |
| 3,674,054 | A * | 7/1972 | Mercier | F16L 55/052 | 138/30 |
| 3,825,034 | A ‡ | 7/1974 | Chouings | F15B 1/106 | 138/30 |
| 4,162,692 | A * | 7/1979 | Greer | F15B 1/12 | 138/30 |
| 4,367,786 | A * | 1/1983 | Hafner | F15B 1/086 | 165/10 |
| 4,595,037 | A ‡ | 6/1986 | LeBreton | F15B 1/14 | 138/30 |
| 4,714,094 | A ‡ | 12/1987 | Tovagliaro | F15B 1/24 | 138/31 |
| 4,785,956 | A * | 11/1988 | Kepler | B29C 53/605 | 138/30 |
| 5,368,073 | A ‡ | 11/1994 | Murphy | F16L 55/053 | 138/26 |
| 5,499,739 | A ‡ | 3/1996 | Greist, III | B29C 53/602 | 138/30 |
| 5,606,996 | A * | 3/1997 | Sugimura | F16L 55/053 | 138/30 |
| 5,822,838 | A * | 10/1998 | Seal | B23K 15/0046 | 29/469.5 |
| 7,152,932 | B2 ‡ | 12/2006 | Kuznicki | B60K 6/12 | 303/87 |
| 2003/0111473 | A1 ‡ | 6/2003 | Carter | F17C 1/06 | 220/586 |
| 2003/0151171 | A1 ‡ | 8/2003 | LeBreton | B29C 70/446 | 264/571 |
| 2004/0026431 | A1 * | 2/2004 | Jones | F17C 1/06 | 220/588 |
| 2004/0045615 | A1 ‡ | 3/2004 | Rupp | F15B 1/106 | 138/30 |
| 2007/0131295 | A1 ‡ | 6/2007 | Rose | B60T 1/10 | 138/30 |
| 2009/0126815 | A1 ‡ | 5/2009 | Rajabi | F15B 1/24 | 138/31 |
| 2010/0084033 | A1 ‡ | 4/2010 | Hummelt | F15B 1/106 | 138/30 |
| 2011/0056960 | A1 ‡ | 3/2011 | Blanc | B29C 53/602 | 220/588 |
| 2013/0092311 | A1 ‡ | 4/2013 | Kobayashi | F17C 1/06 | 156/64 |
| 2014/0299609 | A1 ‡ | 10/2014 | Baltes | F15B 1/086 | 220/581 |
| 2014/0311603 | A1 * | 10/2014 | Baltes | F15B 1/086 | 138/30 |
| 2015/0013814 | A1 ‡ | 1/2015 | Preston | F15B 1/025 | 138/30 |
| 2015/0102043 | A1 ‡ | 4/2015 | Nettis | F17C 1/06 | 220/586 |

* cited by examiner
‡ imported from a related application

LIGHTWEIGHT COMPOSITE OVERWRAPPED ACCUMULATORS

CROSS-REFERENCE TO RELATED APPLICATIONS

This application is continuation-in-part of U.S. patent application Ser. No. 15/389,374, filed Dec. 22, 2016, which is incorporated by reference herein in its entirety.

FIELD OF THE INVENTION

The present invention relates to an improved lightweight composite overwrapped accumulators and methods for producing and using the same. In particular, the present invention relates to high-pressure lightweight accumulators. The accumulators of the invention include a plurality of hollow casings that are combined to form an accumulator housing and a composite overwrap that provides structural and mechanical strength to maintain structural integrity. Accumulators of the invention include a flexible diaphragm having a plurality of mounting flanges that are disposed within a plurality of annular cavities formed between the first and the second hollow casings thereby securing said flexible diaphragm therebetween,

BACKGROUND OF THE INVENTION

High pressure vessels are typically fabricated in a single piece construction using, for example, steel, or are welded together to prevent leakage. Conventional methods of producing high pressure vessels include rolling the material into a desired shape and often forging parts that are welded together. Some mechanical properties of steel may be adversely affected by welding, unless special precautions are taken. Using welding to manufacture high pressure vessels introduces point of failure as well as increasing the time and cost of producing high pressure vessels.

Some high-pressure vessels are used as diaphragm accumulators. These accumulators are typically made of steel. They are traditionally of two distinct designs: threaded and welded. The former design allows for replaceable/serviceable diaphragms, while the latter does not. In both design variations, thick steel shells are mated together with a diaphragm captured in between, typically in the proximity of the threaded or the welded joint. The steel shell supports the structural load arising from the internal pressure. In the threaded version, the two halves are machined for threads and seal interface. The pressure sealing of the accumulator at the threaded joint is achieved by compression or securing the elastic diaphragm periphery close to the threaded joint. The fluid and gas ports are either integral to the shell or welded on to them using a secondary traditional welding process.

In the welded version, the two sections of the shell are manufactured using casting, forging or machining followed by weld at the seam. The halves are welded using laser or electron beam to avoid heat ingress inside the shell that can damage the diaphragm. In most legacy diaphragm accumulators of welded kind, the diaphragm is held in place during mating of the two halves at the equator using a metal clip that prevents the diaphragm from slipping inside the inside surface.

Some accumulator manufacturers have attempted to reduce weight of diaphragm accumulators by substituting steel with lighter and/or stronger materials, such as aluminum, titanium or brass and reducing the wall thickness of the shell. Other attempts to produce lighter diaphragm accumulators include replacing the steel shells (cylinder with domes) with aluminum, welding the two aluminum halves and overwrapping them with composite material. However, there has been limited effort in designing diaphragm accumulators that does not require welding or threading altogether.

Because welding or threading adds to the complexity and time to production of high-pressure vessels in general and diaphragm accumulators in particular, it is desirable to produce a high-pressure vessels or diaphragm accumulators without the use of welding or threading. Furthermore, as high-pressure vessels find use in a wide variety of application, such as diaphragm accumulators in robotics, automobiles, aircrafts, prosthetics, pulsation dampeners, etc., it is desirable to produce high pressure vessels that are significantly lighter in weight yet providing the same or greater pressure gradient without the need for welding.

Conventional two-part accumulators that use a flexible diaphragm as a seal or a separator between two chambers suffer from failure of the flexible diaphragm under repeated cycle of high-pressure conditions. In particular, failure results from the flexible diaphragm which is held in place between two hollow casings, e.g., in an annular groove that is formed between two hollow casings, being pulled out of place during repeated pressurization/depressurization processes.

Therefore, there is a need for more securely placing a flexible diaphragm between two hollow casings to avoid or significantly reduce the failure rate.

SUMMARY OF THE INVENTION

Conventional high-pressure vessels are typically manufactured as a single piece pressure vessel housing (sometimes referred to herein as "liner"). Other conventional higher-pressure vessels such as diaphragm accumulators are fabricated from two or more hollow casings and are welded or threaded to form the high-pressure housing.

In contrast, the lightweight high-pressure accumulators of the present invention include an accumulator housing that is made from a plurality of hollow casings without welding or threading. In particular, the lightweight high-pressure accumulators of the present invention comprise a composite overwrap over the accumulator housing that provides mechanical strength and structural support.

One particular aspect of the invention provides a lightweight composite overwrapped diaphragm accumulator comprising:

(i) an accumulator housing 102 comprising a first hollow casing 104A and a second hollow casing 104B, wherein

- A) said first hollow casing 104A comprises:
  - (a) an inner mating portion 124 having an outer mating surface 130,
  - (b) a plurality of annular grooves (120A and 120B) on the outer mating surface 130 of said inner mating portion 124, and
  - (c) a first orifice 116A for introducing a first pressure medium; and
- B) said second hollow casing 104B comprises:
  - (a) a second orifice 116B for introducing a second pressure medium,
  - (b) an outer mating portion 128 having an inner mating surface 134 such that when said inner mating portion 124 is secured together with said outer mating portion 128 forms a mated joint that comprises a plurality of annular cavities (120A and 120B) within an interstitial space of said mated joint;

C) a flexible diaphragm 112 having a plurality of mounting flanges (112A and 112B) disposed within said plurality of annular cavities (120A and 120B) within said mated joint thereby securing said flexible diaphragm 112 therebetween, wherein said flexible diaphragm 112 subdivides an interior of said accumulator housing into first and second pressure medium storage areas, said first pressure medium storage area accommodating said first pressure medium, said second pressure medium storage area accommodating said second pressure medium, (ii) a composite overwrap material 108 encasing said accumulator housing 102 and providing mechanical strength for holding said accumulator housing under pressure and providing a sealing means to prevent leakage of a fluid medium contained within said accumulator housing 102.

The composite overwrap provides mechanical strength for holding and maintaining the accumulator housing's structural integrity under high pressure. The accumulator housing comprises a plurality of hollow casings joined together to form said accumulator housing. In one particular embodiments, the accumulator housing comprises a first and a second hollow casings.

The composite overwrap encasing the accumulator housing provides the necessary mechanical strength for holding the pressure vessel under pressure and aids in maintaining the structural integrity. In some embodiments, the composite overwrap also provides sealing means to prevent leakage of a fluid medium contained within the accumulator housing.

The first and the second hollow casings of the accumulator housing include a first and a second orifices or connection joints (e.g., ports having a valve or other mechanisms) for introducing a first and a second pressure mediums. The flexibly diaphragm, which is often an elastomer, subdivides an interior of the accumulator housing into first and second pressure medium storage areas. In this manner, the first pressure medium storage area accommodates a first pressure medium, and the second pressure medium storage area accommodates a second pressure medium.

Yet in some embodiments, the parameter of [(maximum service pressure×internal volume)/mass of said pressure vessel] of the lightweight composite overwrap high-pressure accumulator is in the range of 10,000 to 100,000 Pa*m$^3$/kg. Still in another embodiment, the parameter of [(maximum service pressure×internal volume)/mass is at least 20,000 Pa*m$^3$/kg.

Still in other embodiments, each of said first and second hollow casings comprises a material independently selected from the group consisting of aluminum, steel, titanium, INCONEL® (austenitic nickel-chromium-based alloy), brass, ceramic, polymer and composite material.

Yet in other embodiments, said first pressure medium is a gas; and said second pressure medium is a liquid. In some instances, said gas comprises an inert gas.

In another embodiment, the interior of said accumulator housing comprises a phase changing material.

Still in another embodiment, one of said first or second pressure medium comprises a cellular foam material.

In yet another embodiment, one of said first or second chambers further comprises a spring like member that stores energy when compressed.

Another aspect of the invention provides a method for producing a composite overwrapped high-pressure accumulator. The method generally includes (i) joining a plurality of hollow casings together with a flexible diaphragm to form an accumulator housing; and (ii) overwrapping said accumulator housing with a composite material thereby providing mechanical strength for holding said accumulator housing under pressure and to provide a sufficient structural integrity (or stiffness) and mechanical strength to prevent leakage of a fluid medium contained within the accumulator housing. Typically, said accumulator housing is produced without any welding, threading, crimping or use of any adhesive between said plurality of hollow casings. In some embodiments, the parameter of [(maximum service pressure×internal volume)/mass of said composite overwrapped accumulator] is in the range of from about 10,000 to about 100,000 Pa*m$^3$/kg.

As can be seen, the lightweight composite overwrapped high pressure accumulator of the invention lacks any welding, threading or crimping to achieve leak-proof property. Furthermore, no adhesive material is used in mating two or more hollow casings of the accumulator housing. In fact, in lightweight composite overwrapped pressure accumulator of the invention, the plurality of hollow casings are mated or joined together without leakage of any fluid medium without welding, threading, crimping or using any adhesive materials. The mechanical strength of the pressure accumulator of the invention are provided by the composite overwrap whereas the leak-proof aspects of the pressure vessels of the invention are provided by the flexible diaphragm between the hollow casing sections. Such use of the fabricating the hollow casing sections reduces the cost and time in manufacturing process of the hollow casing and hence the composite overwrapped pressure accumulator. Furthermore, the use of a distinct joint between the hollow casings in the composite overwrapped pressure accumulator ensures a leak-before-burst failure mode unlike the welded, threaded or crimped high-pressure accumulators.

DETAILED DESCRIPTION OF THE INVENTION

One of the key short comings of the conventional accumulators that use a flexible diaphragm as a seal or a separator between two chambers or hollow casings is failure of the flexible diaphragm under repeated cycle of high-pressure conditions. In particular, failure results from the flexible diaphragm which is held in place between two hollow casings, e.g., in an annular groove that is formed between two hollow casings, being pulled out of the annular groove during repeated pressurization/depressurization processes.

In contrast, the high-pressure composite overwrapped high-pressure accumulators of the invention significantly reduces or completely eliminates having the flexible diaphragm being pulled out of the annular grooved that is formed between two hollow casings that form accumulator housing.

The present invention will now be described with regard to the accompanying drawings which assist in illustrating various features of the invention. In this regard, the present invention generally relates to a lightweight composite overwrapped high-pressure diaphragm accumulator. That is, the invention relates to lightweight composite overwrapped high-pressure accumulators that comprise a plurality of hollow casings that are mated or joint together with a flexible diaphragm placed in between the hollow casings to form a seal as well as a diaphragm that separates two fluid mediums in the accumulator. The accumulator housing that is formed by a plurality of hollow casings is then overwrapped with a composite material, which contributes or provides overall structural integrity and mechanical strength. By using a flexible diaphragm as a seal between the hollow casings results in an accumulator that avoids use of welding, threading or crimping. Unless context requires otherwise, the terms "composite material," "composite," and "composite overwrap material" are used interchangeably herein and refers to materials made from two or more constituent materials with significantly different physical or chemical properties. When combined, these materials produce a composite material with characteristics typically different from the individual components. It should be appreciated the individual components may remain separate and distinct within the finished structure. The new material or composite material is desired for many reasons, including but not limited to, being stronger, lighter, or less expensive compared to traditional materials. In one particular embodiment, composites of the invention are carbon fiber based composite materials, such as carbon fiber-reinforced polymers.

Figure 1:
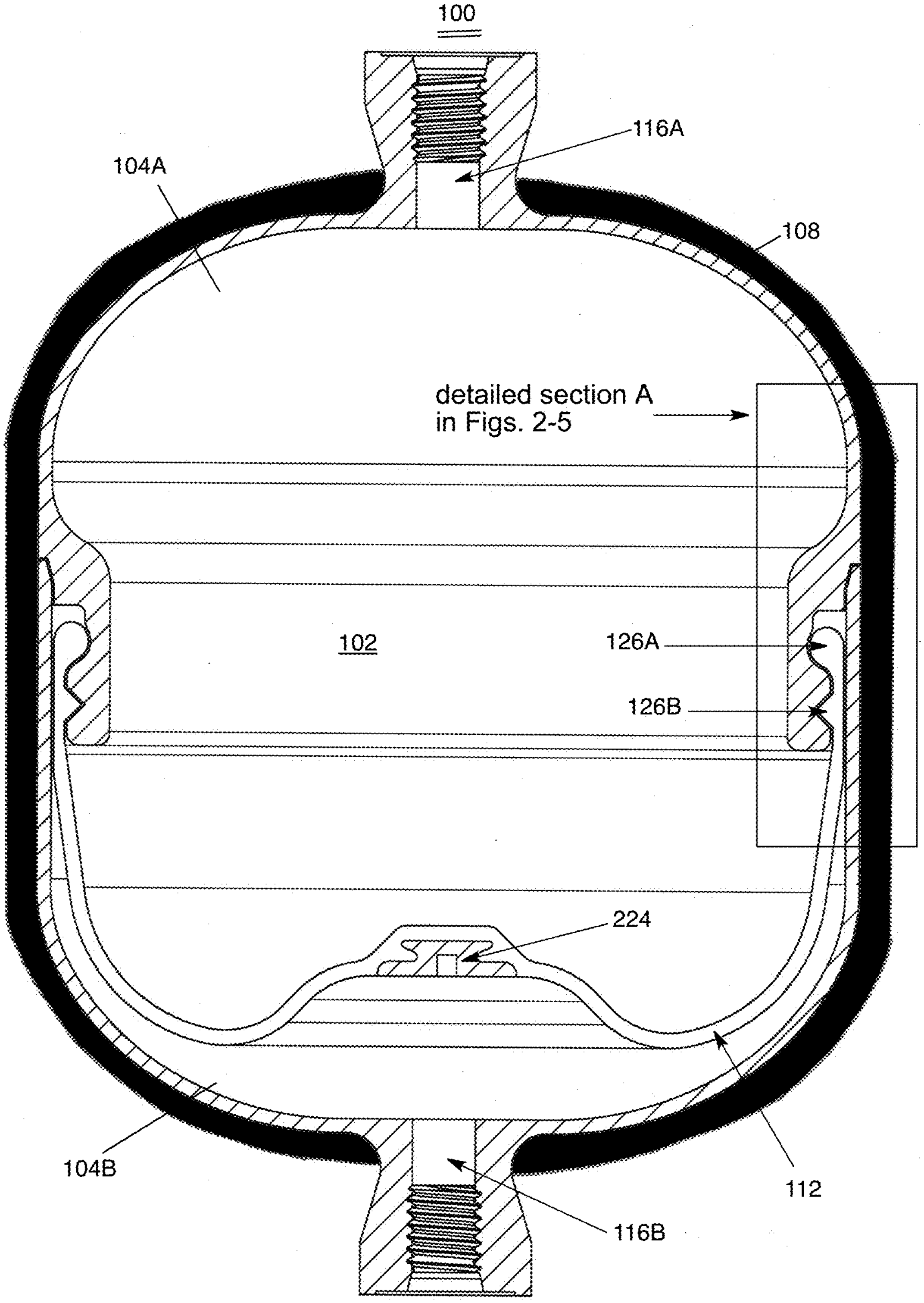
FIG. 1 is a cutaway view of one particular embodiment of a lightweight composite overwrapped high-pressure accumulator of the invention.
Figure 2:
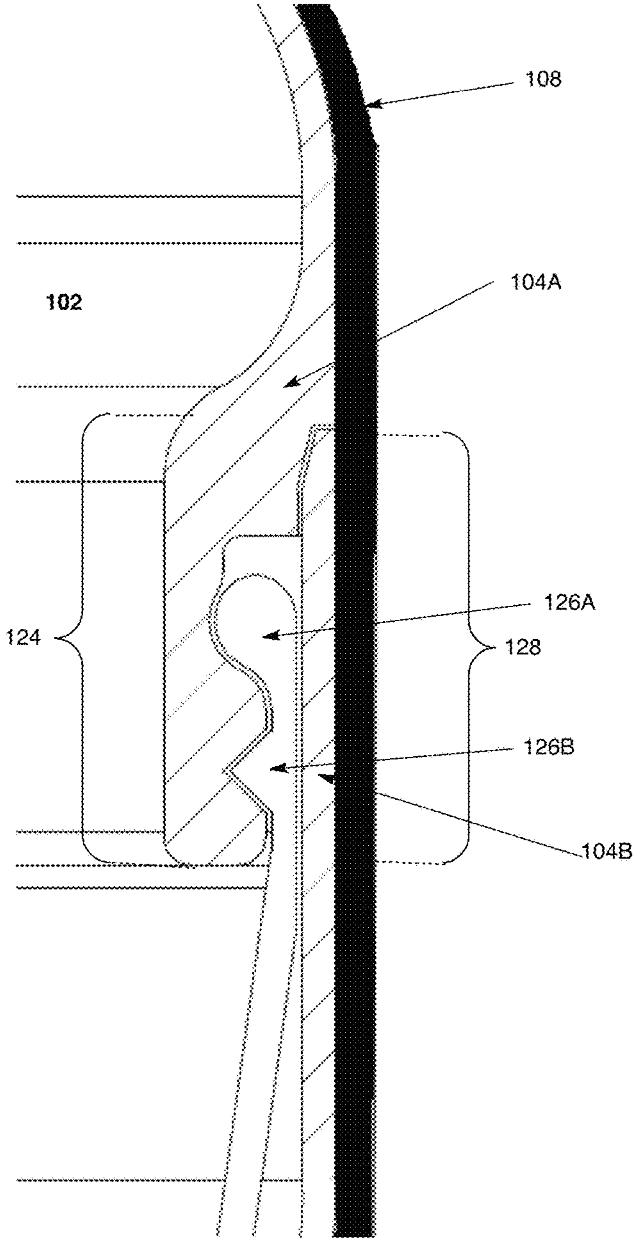
FIG. 2 is a detailed view of section A of a lightweight composite overwrapped high-pressure accumulator shown in FIG. 1.
Figure 3:
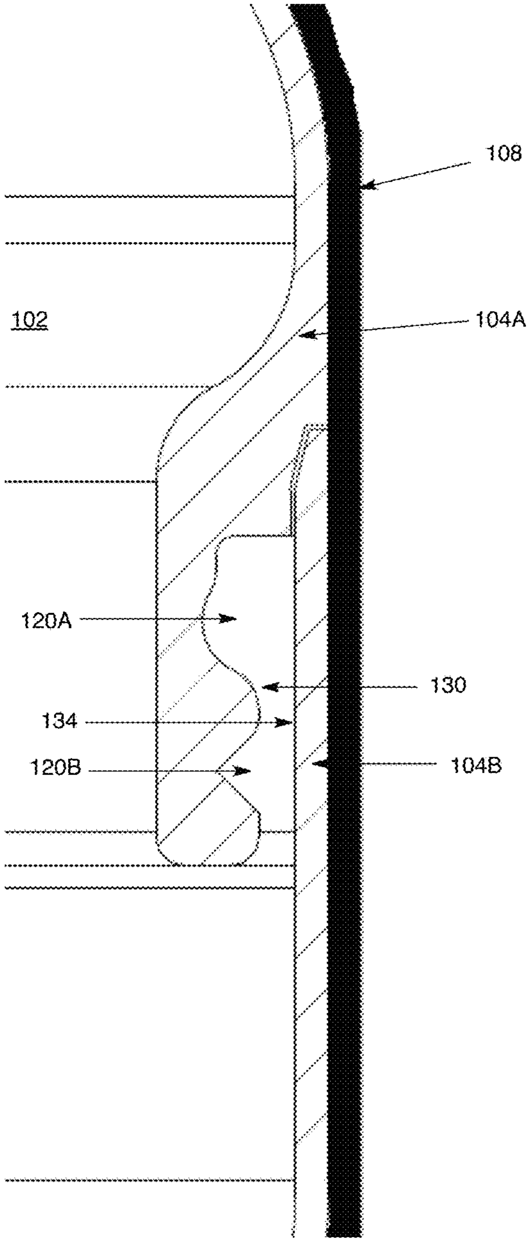
FIG. 3 is a detailed view of section A of a lightweight composite overwrapped high-pressure accumulator shown in FIG. 1 without the flexible diaphragm 112.

One particular embodiment of a composite overwrapped high-pressure accumulator is generally illustrated in FIGS. 1-3. It should be appreciated that the accompanying figures are provided solely for the purpose of illustrating the practice of the present invention and do not constitute limitations on the scope thereof.

As shown in FIGS. 1-3, the lightweight composite overwrapped high-pressure accumulator 100 comprises a plurality of hollow casings (104A and 104B). It should be appreciated that while the accompanying figures typically show only two sections that are mated or joined, the number of hollow casings that can form an accumulator housing 102 is not limited to two sections (e.g., 104A and 104B). The accumulator housing (not including the composite overwrap 108) can be made from three or more sections or more sections, four or more sections, and so forth. The only requirement in the scope of the invention is that the total number of hollow casing sections, when joined or mated together form one complete accumulator housing 102.

Referring again to FIGS. 1-3, the hollow casings 104A and 104B are mated or joined with a flexible diaphragm 112 as a joint sealing means. As can be seen, flexible diaphragm 112 serves to provide a sealing means between two hollow casings 104A and 104B to prevent any fluid leakage as well as serving to form a barrier between two sections of the accumulator. As can be seen in FIGS. 1-3, the flexible diaphragm 112 is placed in a plurality of channels, or annular grooves, or slots that are present in one of the sections of the hollow casing.

The lightweight composite overwrap high-pressure accumulator 100 includes a composite overwrap 108 that provides the mechanical strength and/or structural integrity of the high-pressure vessel. The lightweight composite overwrap high-pressure accumulator 100 includes one or more orifices or ports 116A and 116B. In one particular embodiment, the lightweight composite overwrap high-pressure accumulator 100 is a hydraulic accumulator or a diaphragm accumulator.

A hydraulic accumulator is an energy storage device. It consists of a high-pressure vessel in which a non-compressible hydraulic fluid is held under pressure by an external source. These accumulators are based on the principle that gas is compressible and oil (or other liquid) is in general incompressible. In a hydraulic accumulator, the accumulator housing 102 is divided into two sections, one containing a gas another containing a liquid, typically an oil. In operation, oil flows into the accumulator (e.g., via orifice 116B) and compresses the gas by reducing its storage volume. Energy is stored by the volume of hydraulic fluid that compressed the gas under pressure. If the oil is released, it will quickly flow out (e.g., through orifice 116B) under the pressure of the expanding gas. Accumulators are widely used in industrial hydraulics to dampen pulsations, compensate for thermal expansion, or provide auxiliary power.

A diaphragm accumulator consists of pressure vessel with an internal elastomeric diaphragm that separates pressurized gas (typically nitrogen gas) on one side from the hydraulic fluid (typically an oil) on the other side (e.g., system side). The accumulator is charged with nitrogen through a valve installed on the gas side. In a diaphragm accumulator, the energy is stored by compressing nitrogen within the gas chamber side with the oil pushing against the diaphragm. Energy is released when the diaphragm is decompressed thereby pushing the hydraulic fluid out of the accumulator's fluid port.

Most legacy diaphragm accumulators are made of steel. They are heavy and bulky. The mass of the lightweight, composite overwrapped diaphragm accumulator of the present invention is a fraction of that of the steel counterparts. Consequently, they provide improved power and energy densities (power and energy per unit mass) that are beneficial in a variety of application including, but not limited to, robotics, automobiles, aircrafts, prosthetics, pulsation dampeners, etc. Moreover, since diaphragm accumulators of the invention are lighter, i.e., has lower mass compared to conventional accumulators of the same volume, they are easier to fabricate, ship, install and maintain.

The diaphragm accumulators of the invention have at least two parts that are joined or mated together without welding, threading or crimping.

Some of the advantages of the diaphragm accumulators of the invention include, but are not limited to, (i) small weight to volume ratio, thereby making them highly suitable for mobile and airborne applications; (ii) fast response time; (iii) good dynamic response characteristics for shock or pulsation dampening application; (iv) higher compression ratio (e.g., typically at least about 5:1, often at least about 6:1, and more often at least about 8:1) than bladder accumulators, which are generally about 4:1; (v) less susceptible to contamination than piston accumulators; and (vi) minimal impact on performance for deviating from the vertical position. Throughout this disclosure, the term "about" when referring to a numerical value means±20%, typically ±10%, often ±5%, and most often ±2% of the numeric value.

Other advantages of lightweight composite overwrapped high-pressure accumulators of the invention (including hydraulic accumulators) include the following specific parameter values. In particular, the parameter of [(maximum service pressure×internal volume)/mass of the composite overwrapped high-pressure accumulator of the invention] is in the range of about 5,000 to 500,000 Pa*$m^3$/kg, typically about 10,000 to 200,000 Pa*$m^3$/kg, and often about 10,000 to about 100,000 Pa*$m^3$/kg. Yet in other embodiments, the parameter of [(maximum service pressure×internal volume)/mass of the composite overwrapped high-pressure accumulator of the invention] is a least about 5,000 Pa*$m^3$/kg, typically at least about 10,000 Pa*$m^3$/kg and often at least about 20,000 Pa*$m^3$/kg.

It should be appreciated that the shape of light weight diaphragm accumulators of the invention can vary significantly depending on its use and applications. In particular, the shape of diaphragm accumulators of the invention can be ellipsoidal, isotensoidal, spherical, ovaloid, toroidal or cylindrical with isotensoidal domes or any other suitable shape desired for a given purpose or intended use. However, for the sake of brevity and clarity, the present disclosure illustrates spherical or ellipsoidal diaphragm accumulator.

Referring again to FIGS. 1-3, the lightweight diaphragm accumulator has at least two sections or parts. In particular, the diaphragm 112 that is located interior of the accumulator housing 102 is enclosed between two mating halves of an accumulator housing, referred to as first and the second hollow casings 104A and 104B, respectively. As discussed above, the accumulator housing 102 can be made from more than two sections. Each of the hollow casings 104A and 104B can be independently made from metal, ceramic, metal alloy, polymer or composite material. In addition, each section or hollow casing can be machined or net formed. Generally, in order to reduce the overall weight, a lightweight material is used for each of the liner sections. Suitable materials for each liner section include, but are not limited to, metals such as aluminum, aluminum alloys, steel alloys, titanium, copper and brass; polymer such as polyethylene, polyamide, polyimide; ceramics such as alumina, silicon nitride; metal alloys such as INCONEL® and invar; composites such as polymer matrix and metal matrix; and other suitable light materials.

In a diaphragm accumulator 100, there is a diaphragm 112 that separates the incompressible fluid in one compartment (e.g., below flexible diaphragm 112) from the compressible gas in another compartment (e.g., above flexible diaphragm 112). Thus, the diaphragm accumulator 100 has a first fluid medium compartment (e.g., gas compartment, i.e., space between the top-half section 104A and diaphragm 112) and a second fluid medium compartment (e.g., a liquid or oil compartment, i.e., space between the bottom-half section 104B and diaphragm 112). The diaphragm accumulator 100 also has a port or an orifice 116A that allows the gas to enter/escape the first fluid medium compartment of the accumulator; and a port or an orifice 116B that can be used to inject or remove the second fluid medium (e.g., liquid or oil) from the second fluid medium compartment. The diaphragm accumulator housing 1002 is overwrapped with a composite material 108 to provide mechanical strength and/or maintain structural integrity of the diaphragm accumulator 100.

The diaphragm 112 can be made of elastomeric material such as buna-Nitrile rubber, HNBR, EPDM, silicon, Viton, etc. Any material that is elastic and can maintain its elasticity for an extended period of time (e.g., at least one year, typically at least three years, often at least five years, and most often at least ten years) can be used. However, it should be appreciated that the scope of the invention is not limited to such a period of usefulness of the elastomeric material.

In some embodiments, the diaphragm can be of pleated construction and made of metal or thermoplastic such as PTFE, Nylon, polyethylene, PVDF or Mylar. The pleated construction allows such a diaphragm to stretch and contract, thereby allowing change in the volume of the first and/or the second fluid medium compartments.

In operation, typically, the gas compartment is precharged with inert gas (typically Nitrogen) using gas charge valve fitted to the gas port 116A. Liquid (typically hydraulic fluid in hydro-pneumatic application) is allowed to enter from the hydraulic system into the diaphragm accumulator 100 through the fluid port 116B.

It should be appreciated the fluid and gas ports (116B and 116A, respectively) can be integral to the liner halves (machined or cast) or they can be attached to the liner halves in a secondary operation such as threading or adhesive bonding.

In some embodiments, the diaphragm 112 has a plurality of bulbs (126A and 126B) at the top periphery (see FIGS. 1 and 2) that is captured in a plurality of grooves 120A and 120B housed between the mating halves of the two sections of the hollow casings 104A and 104B. The bulb section of the diaphragm can be an integral part of the diaphragm 112 or can be a configuration of a stand-alone o-ring 112 (FIG. 1).

The geometry of the bulb (i.e., the top periphery of diaphragm 112), the annular grooves 120A and 120B in the hollow casing halves that house the plurality of bulbs (126A and 126B), the stiffness of the hollow casings 104A and 104B in the zone surrounding the annular grooves 120A and 120B and the stiffness provided by the composite overwrap 108 are designed to prevent fluid leakage (both gas and fluid) at the mating surface between the two sections of the liner. It should be appreciated that more than two annular grooves (120A and 120B) can be present in the mating section. For example, one can have three, four or even five annular grooves. However, it has been found having two annular grooves is sufficient to significantly reduce or even completely eliminate diaphragm slippage, pull-out or failure.

Figure 4:
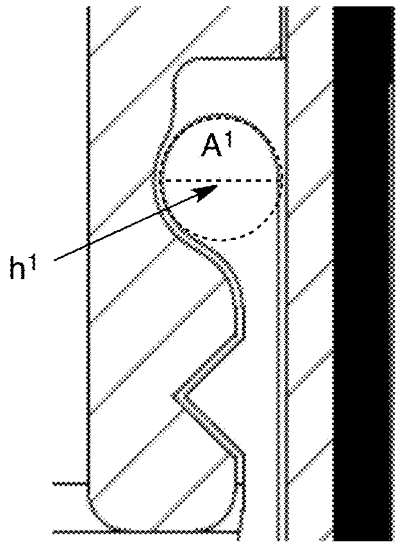
FIG. 4 shows a cross-section area $A^1$ and diameter or height $h^1$ of the first bulb 126A of diaphragm 112.
Figure 5:
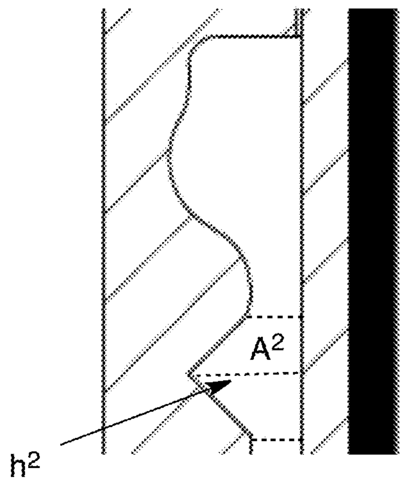
FIG. 5 shows a cross-section area $A^2$ and height $h^2$ of the second annular groove 120B.

In further embodiments, the cross-section area (A', represented as a dotted circle in FIG. 4) of the first diaphragm bulb 126A is greater than the cross-section area of the second annular groove 120B ($A^2$, represented by two dotted lines surrounding height $h^2$ in FIG. 5 and the conically-shaped outer mating surface 130 and the flat inner mating surface 134). In this manner, even if the second diaphragm bulb 126B fails, e.g., is pulled-out of the second annular groove 120B, the first diaphragm bulb 126A cannot be pulled-through the second annular groove 120B due to its larger cross-sectional area relative to the cross-sectional area of the second annular groove 120B. In some embodiments, the cross-sectional area of the first diaphragm bulb 126A is at least 2%, typically at least 5%, often at least 10%, and most often at least 15% more than the cross-sectional area of the second annular groove 120B.

Alternatively, the height h1 (FIG. 4) of the first diaphragm bulb 126A is significantly higher than the height h2 (FIG. 5) of the spacing in the second annular groove 120B. Thus, if and when the second diaphragm bulb 126B fails, e.g., is pulled-out of the second annular groove 120B, the first diaphragm bulb 126A cannot be pulled-through the second annular groove 120B due to its longer or higher height $h^1$ relative to the height $h^2$ of the second annular groove 120B. In some embodiments, the height $h^1$ of the first diaphragm bulb 126A is at least 5%, typically at least 10%, often at least 15%, and most often at least 20% more than the height $h^2$ of the second annular groove 120B.

The effectiveness of the bulb in the diaphragm to provide a pressure-tight seal between the two liner sections is typically determined by one or more of the following: (i) the amount of pre-compression achieved during the mating or assembly of the two halves of the hollow casings 104A and 104B; (ii) the pre-stress imparted on the hollow casings 104A and 104B during the composite overwrapping process using pre-tensioned fiber tows; and (iii) the pre-stress achieved during the autofrettage process of the composite overwrapped vessel after the composite fabrication is complete.

In some cases, the diaphragm 112 is subjected to pre-charge pressure on the gas side in the absence of hydraulic fluid. Thus, in some embodiments, a stop 224 that is more rigid than the diaphragm 112 is attached to the bottom of the diaphragm. Alternatively, the stop 124 can be present in the interior of the bottom hollow casing 104B. The stop 124 prevents extrusion of the diaphragm 112 through the fluid port 116B in the absence of any fluid pressure in the fluid compartment.

Under hydraulic operation when there is liquid or oil in the fluid compartment, the pressure in the fluid compartment equals that in the gas compartment and the diaphragm 112 is under neutral pressure acting perpendicular to the diaphragm thickness.

In one embodiment, the internal pressure in the fluid and gas compartments being equal is supported by both sections of the liner and the composite overwrap over the liner. Yet in another embodiment, the internal pressure is supported entirely by the two sections of the hollow casings if they are bonded, welded or fastened together.

When fluid enters the fluid compartment through fluid port 116B, the diaphragm 112 deforms towards the gas compartment and compresses the gas to restore pressure equilibrium between the gas and the fluid compartments. Energy is stored in the compressed gas. When the pressure in the fluid compartment drops or when fluid leaves the fluid compartment through fluid port 116B, the diaphragm 112 regains its original configuration by expanding towards the fluid compartment thereby decompressing the gas and recovering the stored energy. In the absence of any external pressure, the pressure on the gas is always in equilibrium with the pressure of the incompressible fluid.

Still in another embodiment, the gas compartment is partially or fully filled with elastomeric material, foam or other compressible material. This allows use of a material other than or in conjunction with gas in the gas compartment side.

Yet still in another embodiment, the elastomeric material or foam occupying the gas compartment can include a phase change material (PCM). When the gas is compressed quickly it results in temperature rise. When the temperature settles, the pressure in the gas compartment drops. This results in less-than-desirable fluid volume that is expelled when the stored energy is recovered. Use of a PCM in the gas compartment allows improved thermal management of the compressed gas during each energy storage and recovery cycle, and therefore allow the accumulator to deliver peak power and operate more efficiently in each cycle.

Typically, the phase-change material is used to reduce the amount of temperature increase compared to a similar accumulator that does not have the phase-change material but is otherwise made of the same material. Typically, the PCM comprises a material that melts (i.e., changes phase) from solid to liquid at a certain temperature. The useful PCMs of the invention have a melting point in the range of from about 0° C. to about 80° C., typically from about 20° C. to about 50° C. PCMs are "latent" heat storage materials. The thermal energy transfer occurs when a material changes from solid to liquid, or liquid to solid. This is called a change in state, or "Phase." Compared to the storage of sensible heat, there is no significant temperature change during the phase change. Initially, these solid-liquid PCMs perform like conventional storage materials; their temperature rises as they absorb heat. Unlike conventional (sensible) storage materials, PCMs absorb and release heat at a nearly constant temperature. PCMs can store 5 to 14 times more heat per unit volume than sensible storage materials such as water, masonry, or rock. A large number of PCMs are known to melt with a heat of fusion in any required range. However, for their employment as latent heat storage materials these materials should exhibit certain desirable thermodynamic, kinetic and chemical properties. Moreover, economic and ready availability of these materials may also be considered.

One of the factors in selecting a particular PCM for a given application include matching the transition temperature of the PCM for the given application. In addition, the operating temperature of heating or cooling should be matched to the transition temperature of the PCM. The latent heat should be as high as possible, especially on a volumetric basis, to minimize the physical size of the heat stored. High thermal conductivity would assist the charging and discharging of the energy storage.

Exemplary PCMs that are suitable for the invention include, but not limited to, organic materials such as paraffin and fatty acids, salt hydrates, water, eutectics, naturally occurring hygroscopic materials, metals and metallic particles, nano-materials. Some of the particular PCMs suitable for the invention include, but are not limited to, heptanone-4®, n-Unedane®, TEA_16®, ethylene glycol, n-dodecane, Thermasorb 43®, Thermasorb 65®, Thermasorb 175+®, Thermasorb 215+°, sodium hydrogen phosphate, Micronal®, and an assortment of other polymeric PCMs.

In another embodiment, the gas compartment contains a spring like device that stores energy by compression. The spring can be made of metal, polymer, elastomer, PCM or composite.

In one particular embodiment, the gas port can be sufficiently large to allow insertion of a bladder that separates the gas from the fluid. This allows for a diaphragm accumulator with a replaceable or serviceable diaphragm.

Unlike monolithic and isotropic material like steel, a composite overwrapped pressure vessel with a large port opening can be designed to withstand very high internal pressure. This is enabled by an optimized design of the structural shape and composite layup such that the composite material is adequately and optimally placed to support the internal pressure. The composite overwrap of the accumulator can be fabricated using filament winding, polar winding, tumble winding, resin transfer molding, vacuum assisted resin transfer molding or a combination thereof. Typically, in these fabrication methods, the composite will consist of high stiffness and high strength fibers like carbon, glass, aramid, basalt or ceramic In some embodiments, the fibers in the composite overwrap layer is impregnated with matrix materials such as epoxy resin, vinyl ester resin, polyester resin, metal or thermoplastics. Alternatively, the composite fibers is not impregnated with matrix materials, i.e., reinforcement is provided by dry fibers only.

Additional objects, advantages, and novel features of this invention will become apparent to those skilled in the art upon examination of the following examples thereof, which are not intended to be limiting. In the Examples, procedures that are constructively reduced to practice are described in the present tense, and procedures that have been carried out in the laboratory are set forth in the past tense.

EXAMPLES

Functioning units of composite overwrapped diaphragm accumulators have been made, tested and used on commercial applications using the invention disclosed herein. Two sizes: 0.5 L and 2 L have been produced and tested. The 0.5 L diaphragm accumulator measures 125 mm dia.×130 mm overall length including the gas port, has a maximum service pressure of 240 bar and weighs 0.5 kgs. providing a [(maximum service pressure×internal volume)/mass] factor of 24,000 Pa*$m^3$/kg. The liner sections of the 0.5 L diaphragm accumulator were fabricated by machining Al 6061-T6 alloy and were assembled along with a diaphragm in between the liner sections to form the accumulator housing. The accumulator housing was subsequently overwrapped with composite material using a filament winding method. After the composite was cured, the assembly was subjected to autofrettage and proof test at 360 bar using water on both compartments (either side of the diaphragm) during which there was no leakage of fluid observed from the pressure vessel. Subsequent to proof test, both compartments were emptied, cleaned and dried. The gas compartment was precharged with Nitrogen gas using a valve port and the valve was closed, sealing off the gas compartment. The fluid compartment was filled with hydraulic oil and connected to a hydraulic pressurization line. The composite diaphragm accumulator was then subjected to hydro-pneumatic cycle tests between the pressure limits of 120 bar and 240 bar for more than 100,000 cycles. The precharge pressure held constant in the gas compartment during and after the test indicating successful operation of the diaphragm accumulator.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All references cited herein are incorporated by reference in their entirety.

What is claimed is:

1. A lightweight composite overwrapped diaphragm accumulator (100) comprising:

(i) an accumulator housing (102) comprising a first hollow casing (104A) and a second hollow casing (104B), wherein A) said first hollow casing (104A) comprises:

(a) an inner mating portion (124) having an outer mating surface (130), (b) a plurality of annular grooves (120A and 120B) on the outer mating surface (130) of said inner mating portion (124), and (c) a first orifice (116A) for introducing a first pressure medium; and B) said second hollow casing (104B) comprises:

(a) a second orifice (116B) for introducing a second pressure medium, (b) an outer mating portion (128) having an inner mating surface (134) such that when said inner mating portion (124) is secured together with said outer mating portion (128) forms a mated joint that comprises a plurality of annular cavities (120A and 120B) within an interstitial space of said mated joint;

C) a flexible diaphragm (112) having a plurality of mounting flanges (126A and 126B) disposed within said plurality of annular cavities (120A and 120B) within said mated joint thereby securing said flexible diaphragm (112) therebetween, wherein said flexible diaphragm (112) subdivides an interior of said accumulator housing (102) into first and second pressure medium storage areas, said first pressure medium storage area accommodating said first pressure medium, said second pressure medium storage area accommodating said second pressure medium, (ii) a composite overwrap material (108) encasing said accumulator housing (102) and providing mechanical strength for holding said accumulator housing (102) under pressure and providing a sealing means to prevent leakage of a fluid medium contained within said accumulator housing (102).

2. The lightweight composite diaphragm accumulator according to claim 1, wherein maximum service pressure times internal volume divided by mass of said accumulator is in the range of 10,000 to 100,000 Pa*$m^3$/kg.

3. The lightweight composite diaphragm accumulator according to claim 1, wherein maximum service pressure times internal volume divided by mass of said accumulator is a least 20,000 Pa*$m^3$/kg.

4. The lightweight composite diaphragm accumulator according to claim 1, wherein each of said first and second liner sections comprises a material independently selected from the group consisting of aluminum, steel, titanium, austenitic nickel-chromium-based alloy, brass, metallic alloys, polymer and composite material.

5. The lightweight composite diaphragm accumulator according to claim 1, wherein said first pressure medium is a gas; and said second pressure medium is a liquid.

6. The lightweight composite diaphragm accumulator according to claim 5, wherein said gas comprises an inert gas.

7. The lightweight composite diaphragm accumulator according to claim 1, wherein the interior of said accumulator comprises a phase changing material.

8. The lightweight composite diaphragm accumulator according to claim 1, wherein one of said first or second pressure medium comprises a cellular foam material.

9. The lightweight composite diaphragm accumulator according to claim 1, wherein one of said first or second chambers further comprises a spring like member that stores energy when compressed.

10. The lightweight composite diaphragm accumulator according to claim 1, wherein a cross-section area $A^1$ of a first diaphragm flange (126A) is greater than a cross-section area $A^2$ of a second annular groove (120B).

11. The lightweight composite diaphragm accumulator according to claim 10, wherein the cross-section area $A^1$ of said first diaphragm flange (126A) is at least 5% more than the cross-section area $A^2$ of said second annular groove (120B).

12. The lightweight composite diaphragm accumulator according to claim 1, wherein height $h^1$ of a first diaphragm flange (126A) is greater than height $h^2$ of a second annular groove (120B).

13. The lightweight composite diaphragm accumulator according to claim 12, wherein the height $h^1$ of said first diaphragm flange (126A) is at least 5% more than the height $h^2$ of said second annular groove (120B).

* * * * *